(12) United States Patent
Ishida et al.

(10) Patent No.: US 7,438,149 B2
(45) Date of Patent: Oct. 21, 2008

(54) MOTORCYCLE

(75) Inventors: Shinichiro Ishida, Saitama (JP); Takero Shibukawa, Saitama (JP); Yutaka Yamakura, Saitama (JP); Shunichi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 11/234,125

(22) Filed: Sep. 26, 2005

(65) Prior Publication Data

US 2006/0065462 A1 Mar. 30, 2006

(30) Foreign Application Priority Data

Sep. 30, 2004 (JP) ............................. 2004-286807

(51) Int. Cl.
*B62K 25/28* (2006.01)

(52) U.S. Cl. .................................... 180/227

(58) Field of Classification Search ................ 180/227; 280/284, 283, 275
See application file for complete search history.

(56) References Cited

U.S. PATENT DOCUMENTS

| 4,078,815 | A | * | 3/1978 | Vetter | 280/203 |
| 4,265,329 | A | * | 5/1981 | de Cortanze | 180/219 |
| 4,724,920 | A | * | 2/1988 | Tsuchida et al. | 180/227 |
| 5,762,353 | A | * | 6/1998 | Miller | 280/284 |
| 5,961,135 | A | * | 10/1999 | Smock | 280/124.11 |
| 6,712,373 | B2 | * | 3/2004 | Chamberlain et al. | 280/284 |
| 7,011,174 | B1 | * | 3/2006 | James | 180/227 |
| 2006/0283650 | A1 | * | 12/2006 | Kawamura et al. | 180/227 |

FOREIGN PATENT DOCUMENTS

| JP | 2-85085 A | 3/1990 |
| JP | 2002-087364 A | 3/2002 |
| JP | 2003-127956 A | 5/2003 |

* cited by examiner

*Primary Examiner*—Kevin Hurley
(74) *Attorney, Agent, or Firm*—Birch, Stewart, Kolasch & Birch, LLP (57) ABSTRACT

A space is secured inside left and right pivot plates and a space is secured in front of a rear wheel to increase flexibility in design. In a motorcycle including left and right pivot plates provided at the rear portion of main pipes, a swing arm is provided on pivots so as to be capable of moving in the vertical direction. Only one rear suspension is interposed between the swing arm and the main pipe that is disposed outside the pivot plate in the direction of the width of the vehicle. A lower end of the rear suspension is connected to an upper surface of an arm portion of the swing arm. The rear suspension is mounted to one of the main pipe so as to extend continuously from the main pipe and substantially linearly in the direction of the length of the vehicle in a top view.

18 Claims, 8 Drawing Sheets

MOTORCYCLE

CROSS-REFERENCE TO RELATED APPLICATIONS

The present application claims priority under 35 USC 119 to Japanese Patent Application No. 2004-286807 filed on Sep. 30, 2004 the entire contents of which are hereby incorporated by reference.

FIELD OF THE INVENTION

The present invention relates to a motorcycle provided with a driveshaft for driving a rear wheel with a rear suspension disposed on the driveshaft side.

DESCRIPTION OF BACKGROUND ART

A structure is known wherein a rear wheel of a motorcycle is driven by a driveshaft and a rear wheel is supported by a rear wheel suspension unit. See, for example, JP-A-2002-87364 Page 6, FIG. 2, Page 7, FIG. 3.

A basic structure of JP-A-2002-87364 is described as follows. In a motorcycle in the related art, a rear wheel mounted to a rear arm is driven by a shaft drive mechanism. This is also a structure in which the rear arm is connected to a rear arm bracket via a pivot shaft with a shock absorber 28 being connected between an upper portion of the rear arm bracket and the rear arm.

However, since the shock absorber is disposed in front of the rear wheel in the motorcycle disclosed in JP-A-2002-87364, a space in front of the rear wheel and a space at a center of the rear arm bracket (corresponding to a pivot plate) to which the shock absorber is connected are occupied. This may cause a problem in designing the motorcycle.

SUMMARY AND OBJECTS OF THE INVENTION

It is an object of an embodiment of the present invention to provide a motorcycle in which a space inside left and right pivot plates is secured to enhance the flexibility in design. In addition, a space in front of the rear wheel is secured to enhance the flexibility in design.

According to an embodiment of the invention, in a motorcycle including pivot plates provided at the rear portion of a main frame, a swing arm is provided on pivots so as to be capable of moving in the vertical direction with a rear wheel mounted to the rear portion of the swing arm, and a rear suspension interposed between the swing arm and the main frame. Only one rear suspension is provided which is disposed outside the pivot plate in the direction of the width of the vehicle.

An embodiment of the present invention provides a lower end of the rear suspension that is connected to an upper surface of the swing arm.

An embodiment of the present invention provides a rear wheel that is driven by a driveshaft.

An embodiment of the present invention provides a swing arm that is composed of a single arm portion for cantilevering an axle of the rear wheel.

An embodiment of the present invention provides a swing arm that is connected between the left and right pivot plates by a single bolt so as to be capable of vertical movement.

An embodiment of the present invention provides a main pipe that is composed of left and right pipes, and the rear suspension is mounted to one of the main pipes so as to extend from the main pipe substantially linearly in the direction of the length of the vehicle in a top view.

An embodiment of the present invention provides an axial center of the rear suspension that is located outside of an axial center of the driveshaft.

In an embodiment of the present invention, since only one rear suspension is provided and is disposed outside the pivot plate in the direction of the width of the vehicle, the rear suspension does not exist inside the left and right pivot plates. Thus, a space inside the pivot plates can be used for a different application. In other words, there is an advantage such that the space is secured inside the pivot plates, whereby flexibility in design can be enhanced.

In an embodiment of the present invention, since the lower end of the rear suspension is connected to the upper surface of the swing arm, the space can be secured in front of the rear wheel to enhance the flexibility of the design.

In an embodiment of the present invention, since the rear wheel is driven by the driveshaft, the advantages in being driven by the driveshaft are obtained.

In an embodiment of the present invention, since the swing arm is composed of the single arm portion which cantilevers the axle of the rear wheel, the advantages of the cantilevered swing arm can be obtained.

In an embodiment of the present invention, since the swing arm is connected between the left and right pivot plates using a single bolt so as to be capable of moving in the vertical direction, the shape of a connecting portion which transmits a load applied to the swing arm to the bolt is upsized, and is a single tubular shape. Consequently, a force applied to the connecting portion (stress) is reduced. Therefore, the strength of the swing arm can be increased, and the strength of a fastening structure for fastening the swing arm can be enhanced.

In an embodiment of the present invention, since the main pipe is composed of the two pipes, the left and right pipes, and the rear suspension is mounted to one of the main pipes so as to extend from the main pipe substantially linearly in the direction of the length of the vehicle in top view, the load applied to the rear suspension can be transmitted to one of the main pipes linearly. Thus, the strength can be increases advantageously with a simple structure.

Also, since the rear suspension is mounted to one of the main pipes so as to extend from the main pipe substantially linearly in the direction of the length of the vehicle in a top view, other parts can be disposed in the space between the main pipes. Thus, the space can be utilized as a storage space for a fuel tank, an air cleaner box, or the like.

In an embodiment of the present invention, the axial center of the rear suspension is located outside of the axial center of the driveshaft. Consequently, the overhanging extent of the driveshaft in the direction of the width of the vehicle can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to accompanied drawings, the best mode for carrying out the present invention will be described.

Figure 1:
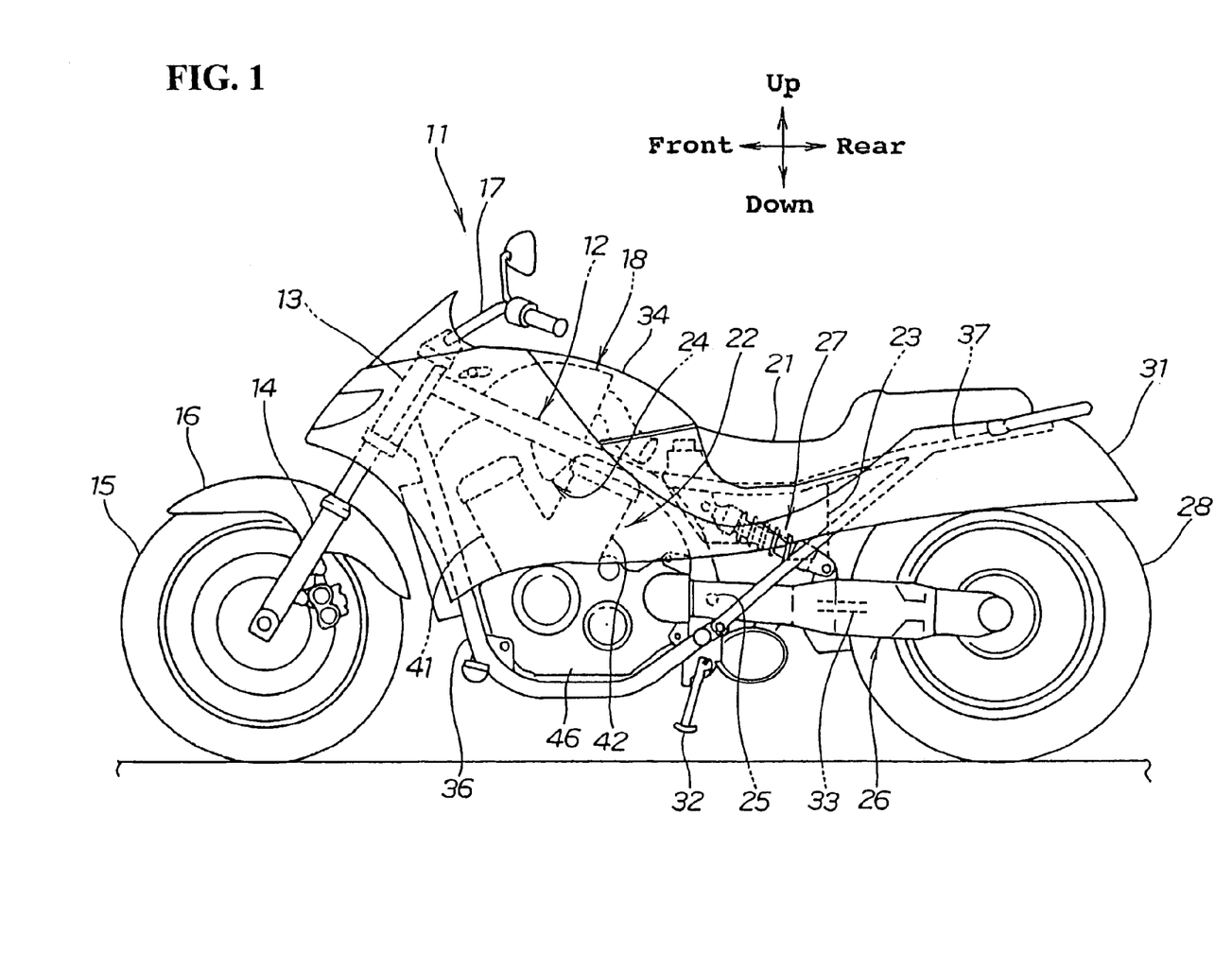
FIG. 1 is a side view of a motorcycle according to the present invention.

FIG. 1 is a side view of a motorcycle of the present invention.

A motorcycle 11 includes a vehicle body frame 12, a front fork 14 mounted to a head pipe 13 of the vehicle frame 12 with a front wheel 15 and a front fender 16 mounted to the front fork 14 and a handle 17 is connected to the front fork 14. An air cleaner 18 is disposed on an upper front portion of the vehicle body frame. 12. In addition, a seat 21 is mounted on top of the vehicle body frame 12. A V-type engine 22 is disposed at a center of the vehicle body frame 12 with a fuel tank 23 disposed behind the V-type engine 22 below the seat 21. A carburetor 24 is connected between an air-intake port of the V-type engine 22 and the air cleaner 18. A swing arm 26 is mounted to a rear portion of the vehicle body frame 12 via a pivot shaft 25 as one single bolt. A rear suspension 27 is provided for suspending a center of the swing arm 26 to the vehicle body frame 12 with a rear wheel 28 mounted to the swing arm 26. A rear fender 31 is provided for covering the rear wheel 28. A stand 32 is mounted to the lower portion of the vehicle frame 12. A drive shaft 33 connects the rear wheel to the V-type engine 22. A cover 34 is provided for covering the air cleaner 18.

Figure 2:
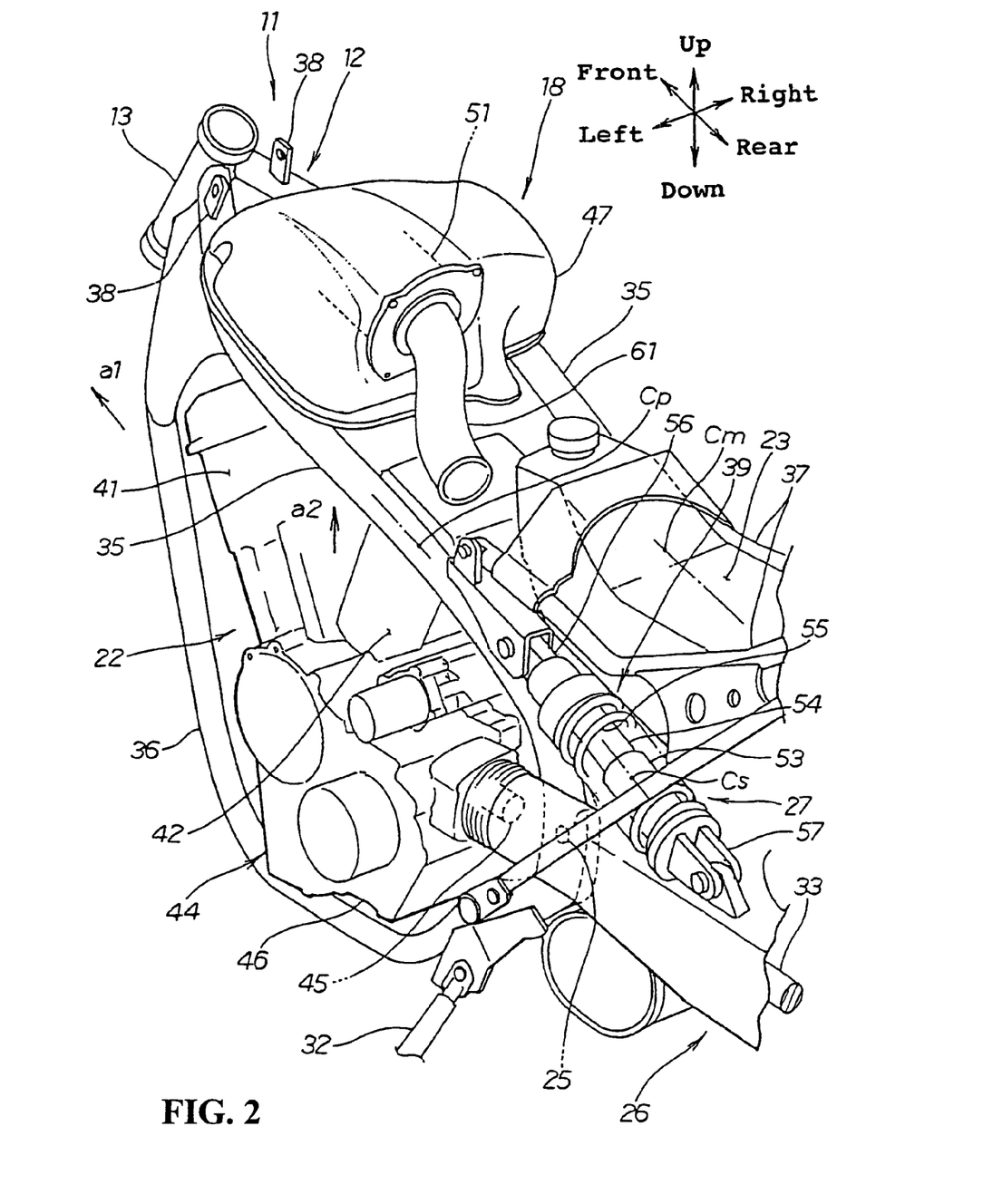
FIG. 2 is a perspective view of the motorcycle according to the present invention.

FIG. 2 is a perspective view of the motorcycle of the present invention, showing a state in which the cover 34 or the seat 21 is removed.

The vehicle body frame 12 includes the head pipe 13 with a pair of left and right main pipes 35, 35 as main frames extending from the head pipe 13 towards the rear and with a pair of left and right down tubes 36, 36 (see FIG. 4) extending from the head pipe 13 rearwardly and downwardly. Seat rails 37, 37 are mounted to the down tubes 36, 36 and the main pipes 35, 35 with front hinges 38, 38 being mounted to the front portions of the main pipes 35, 35. A detail description will be given below. A rear suspension mounting structure 39 is provided together with a center axis Cm of the vehicle body, and a center axis Cp of the main pipe 35.

The V-type engine 22 is a water-cooled, two-cylinder type that includes a front cylinder 41 inclined toward the front (a direction indicated by an arrow a1) with a rear cylinder 42 inclined toward the rear. The air cleaner 18 supplies fuel into the front and rear cylinders 41, 42. A transmission unit 44 is connected to the respective pistons reciprocating in the front and rear cylinders 41, 42 via gears with an output shaft 45 being connected to the rearmost position of the transmission unit 44.

The rear suspension 27 includes a tube 53, a rod 54 which commits to a stroke movement in the tube 53, a spring 55, an upper end 56 formed on the rod 54, and a lower end 57 as a lower extremity formed on the tube 53. Reference sign Cs designates a center axis as an axial center of the rear suspension 27.

Figure 3:
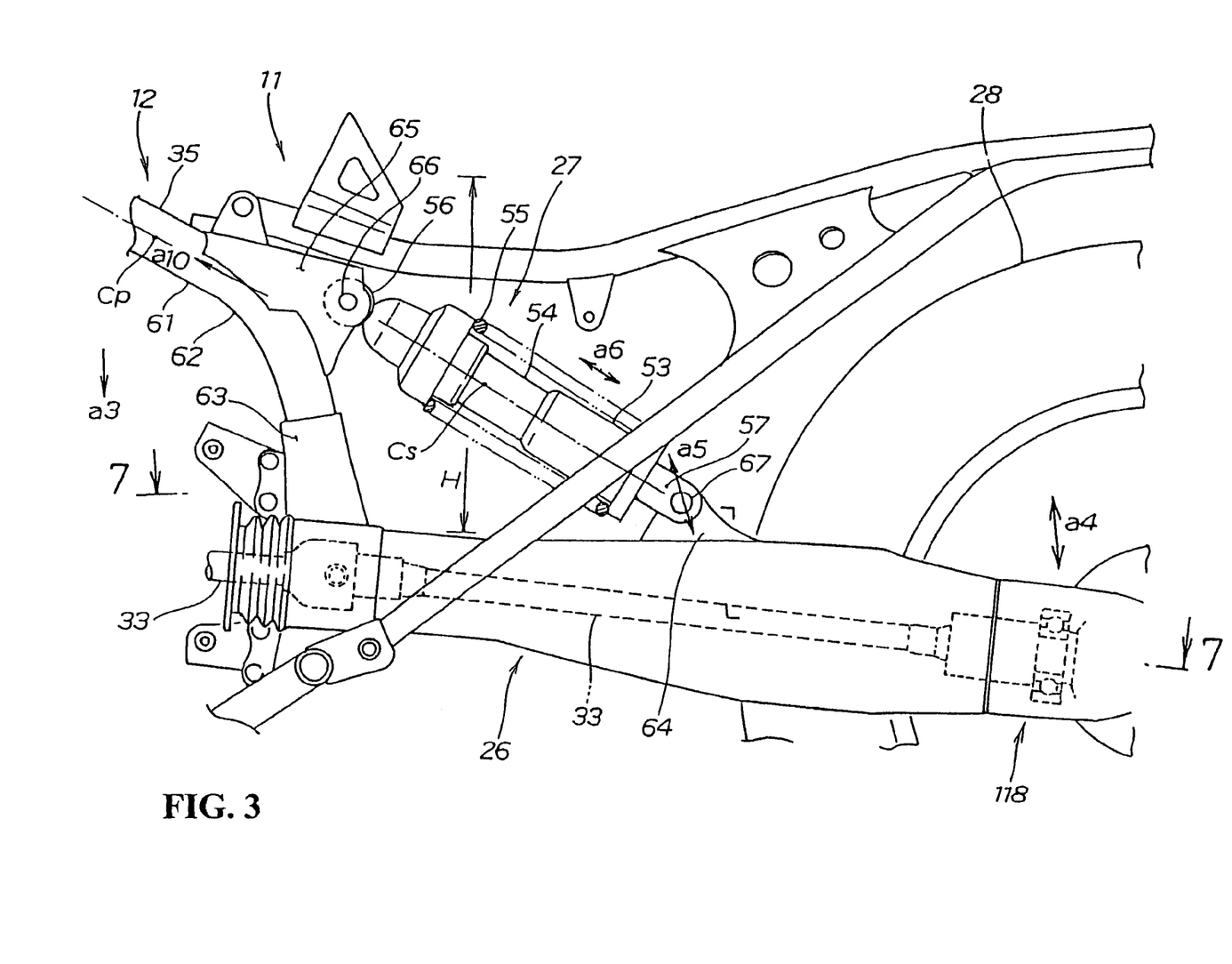
FIG. 3 is a drawing showing a state in which a swing arm and a rear suspension are connected to a vehicle body frame of the motorcycle according to the present invention.

FIG. 3 is a drawing showing a state in which the swing arm and the rear suspension are connected to the vehicle body frame of the motorcycle according to the present invention.

More specifically, the motorcycle 11 is formed with a bent portion 62 directed downwardly (a direction indicated by an arrow a3) at a rear portion 61 of the left main pipe 35 of the vehicle body frame 12. A pivot plate 63, positioned on the drive shaft 33 side and on the left side, is mounted to the bent portion 62. The swing arm 26 is connected to the pivot plate 63 and a lower connecting bracket 64 is mounted to the swing arm 26. An upper connecting bracket 65 is mounted to the bent portion 62. The upper end 56 of the rear suspension 27 is connected to the upper connecting bracket 65 via a pin 66 with the lower end 57 of the rear suspension 27 being connected to the lower connecting bracket 64 via a pin 67. Thus, when an impact is applied to the rear wheel 28, the swing arm 26 swings as indicated by an arrow a4, and the lower connecting bracket 64 is shifted as indicated by an arrow a5 and the rear suspension 27 is expanded and contracted as indicated by an arrow a6.

In the motorcycle 11, the rear suspension 27 is mounted between the left main pipe 35 and the swing arm 26 so that the center axis Cs of the rear suspension 27 aligns substantially linearly with of the center axis Cp of the left main pipe 35 in the vertical direction.

Subsequently, the vehicle body frame 12 will be described in detail referring to FIG. 4 through FIG. 6.

Figure 4:
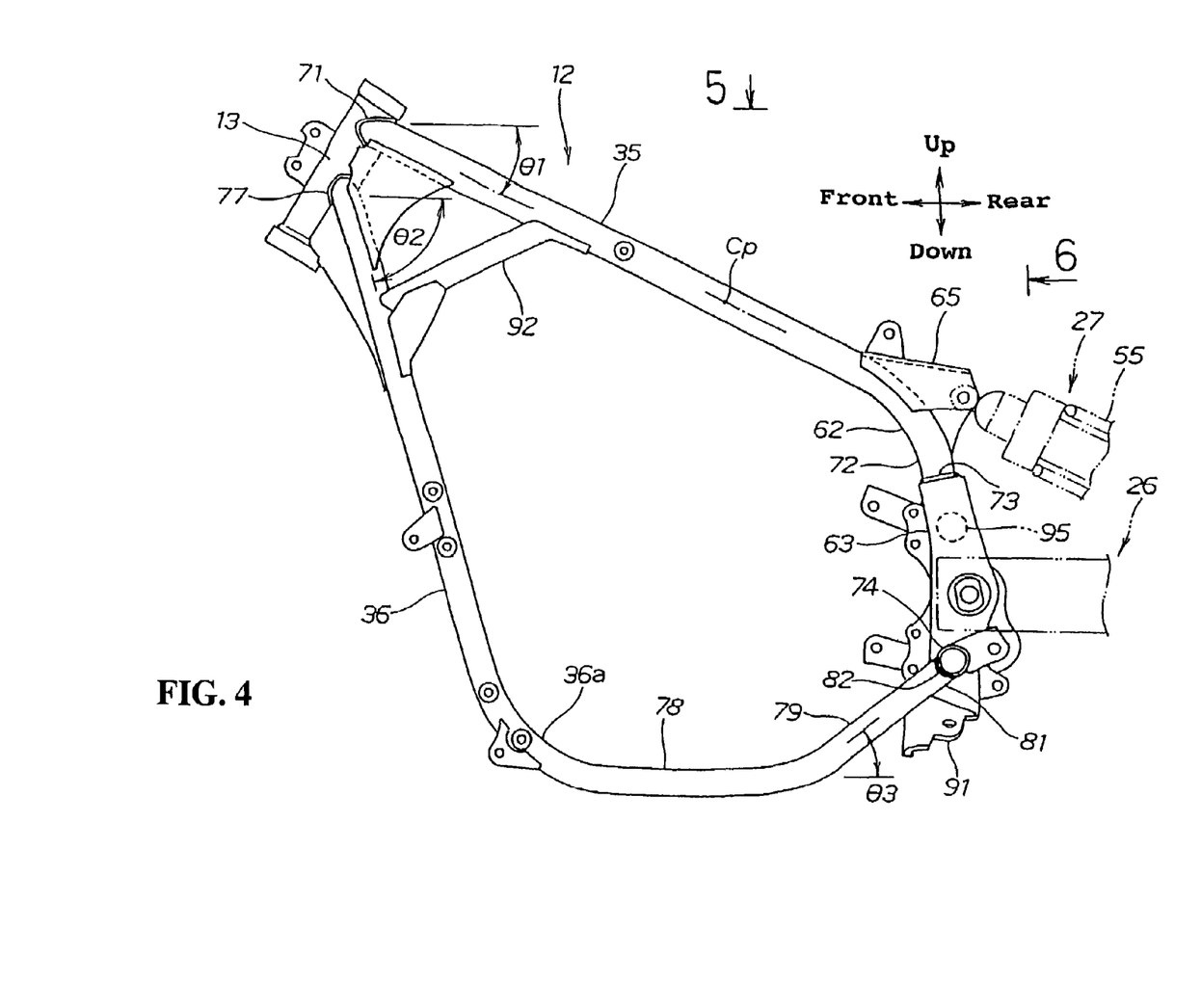
FIG. 4 is a side view of the vehicle body frame which is employed in the motorcycle according to the present invention.

FIG. 4 is a side view of a vehicle body frame employed in the motorcycle of the present invention.

The vehicle body frame 12 is configured in such a manner that the left main pipe 35 is mounted to the head pipe 13 via a welding portion (including bead) 71 so as to be inclined downward by an angle θ1 with respect to the horizontal direction with the bent portion 62 of the left main pipe 35 being formed to extend substantially in the vertical direction. The pivot plate 63 is mounted to an end 72 of the bent portion 62 via a welding portion (including bead) 73, and the end of the pivot plate 63 is mounted to a lower cross pipe 74 as the cross pipe via a welding portion (including bead) 75. See FIG. 6. Then, the left down tube 36 is mounted to the head pipe 13 via a welding portion (including bead) 77 so as to be inclined by an angle θ2 with respect to the horizontal direction with a lower pipe 78 extending horizontally towards the rear of the vehicle body from the lower end 36a of the down tube 36. A rear pipe portion 79 of the lower pipe 78 is formed so as to be inclined upwardly by an angle θ3 with respect to the horizontal direction with a rear end 81 of the lower pipe 78 being connected to the lower cross pipe 74 that is mounted via a welding portion 82.

Figure 5:
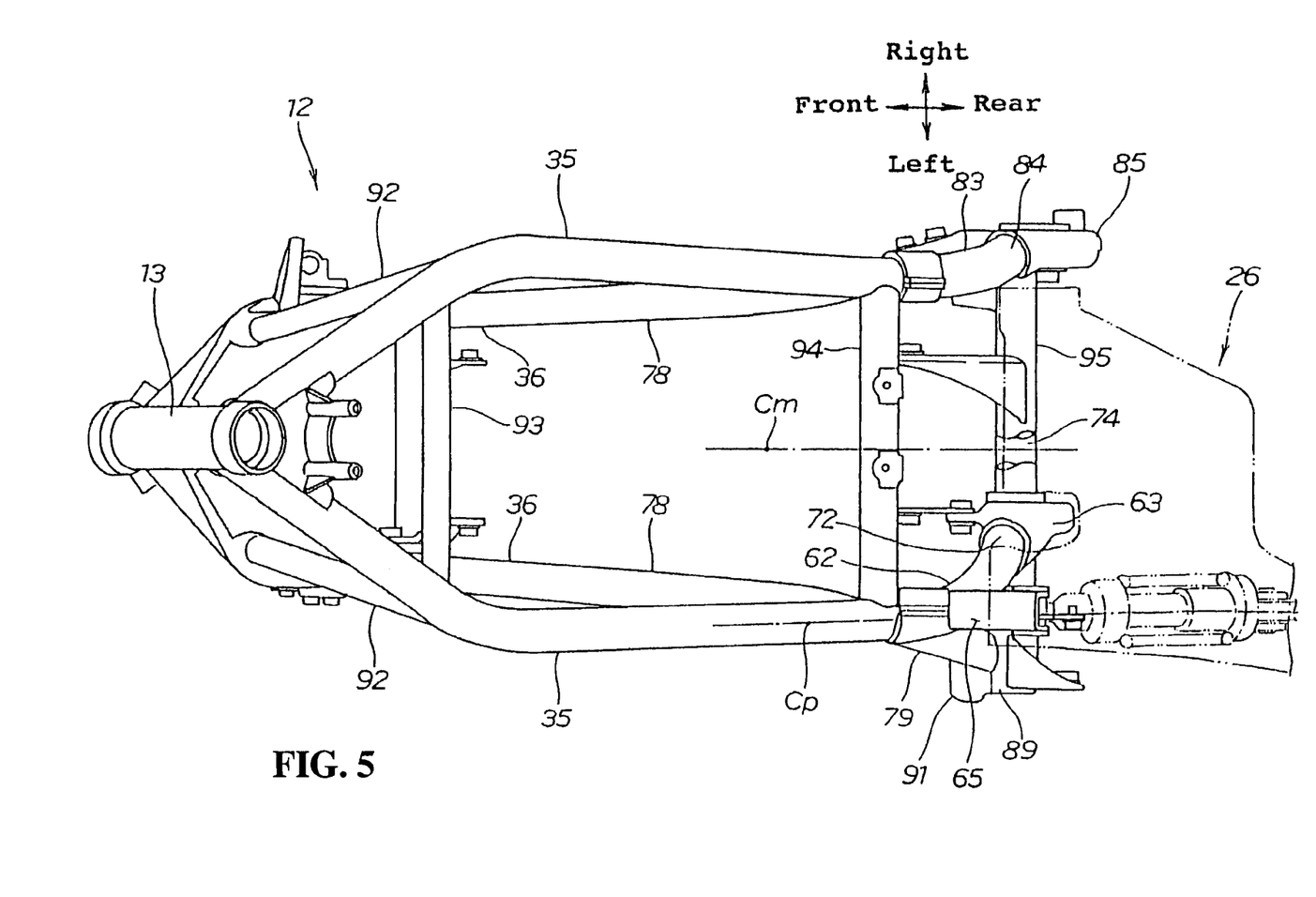
FIG. 5 is a drawing viewed in the direction indicated by an arrow 5 in FIG. 4.

FIG. 5 is a drawing viewed in the direction indicated by an arrow 5 in FIG. 4. FIG. 5 is a plan view of the vehicle body frame 12.

The vehicle body frame 12 is also configured in such a manner that the right main pipe 35 is mounted to the head pipe 13 by welding, and a right pivot plate 85 is mounted to an end 84 of a bent portion 83.

Figure 6:
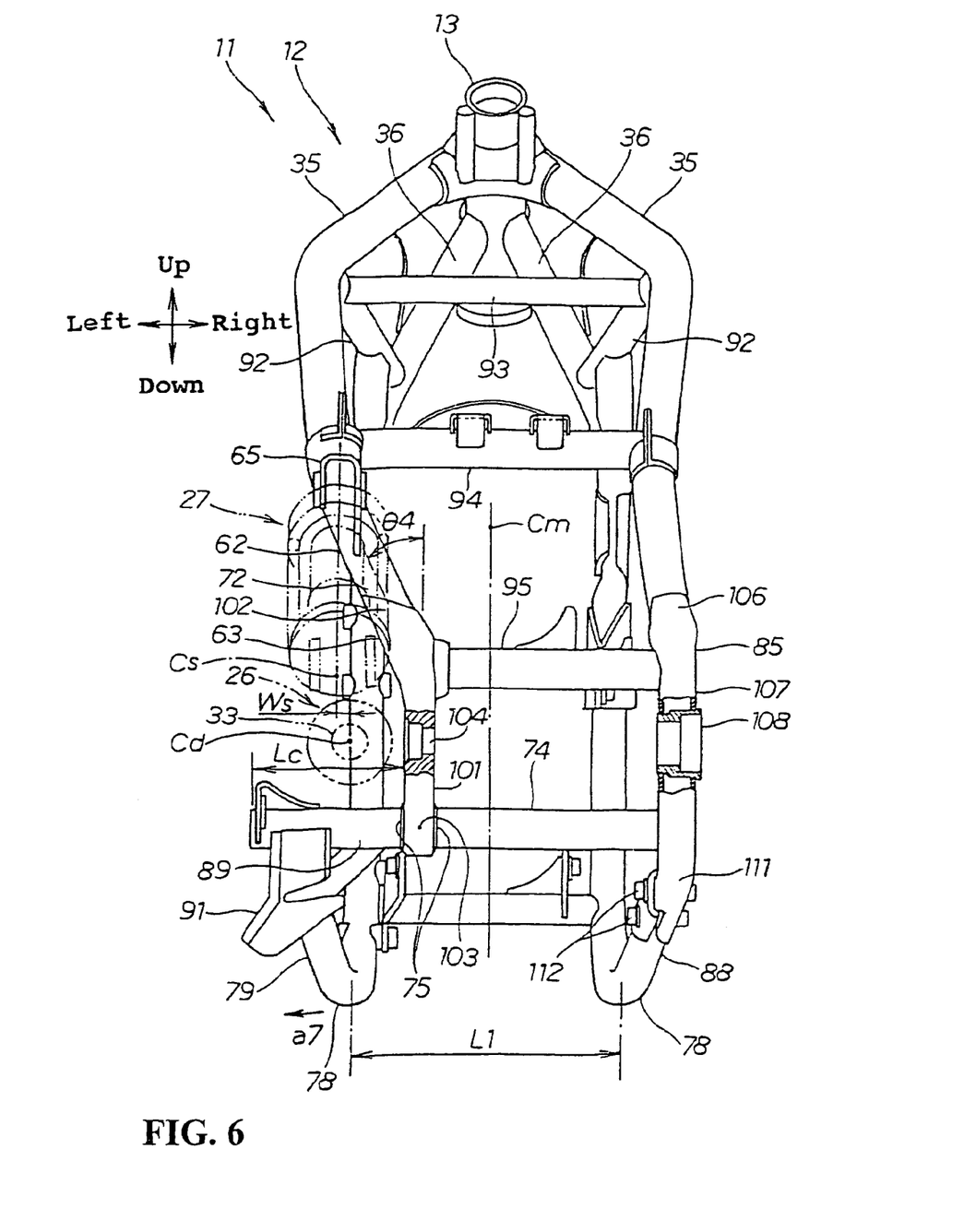
FIG. 6 is a drawing viewed in the direction indicated by an arrow 6 in FIG. 4.

FIG. 6 is a drawing viewed in the direction indicated by an arrow 6 in FIG. 4. FIG. 6 is a back view of the vehicle body frame 12.

The vehicle body frame 12 is configured in such a manner that the right pivot plate 85 shown at the lower right position in the drawing is welded to the lower cross pipe 74 with the right down tube 36 being welded to the head pipe 13. The lower pipe 78 that continues from the right down tube 36 extends horizontally towards the rear of the vehicle body with a rear pipe portion 88 continuing from the lower pipe 78 being bent upwardly. An end of the rear pipe portion 88 is connected to the pivot plate 85.

The bent portion 62 of the left main pipe 35 of the vehicle body frame 12 is bent toward the center axis Cm of the vehicle body by an angle θ4 with respect to the vertical direction. On the other hand, the rear pipe portion 79 of the down tube 36 is bent so as to be directed upwardly, and outwardly (a direction indicated by an arrow a7) so as to extend away from the center axis Cm of the vehicle body. Thereafter, the rear end 81 of the rear pipe portion 79 (see FIG. 4) is welded to a projecting portion 89 of the lower cross pipe 74.

In FIGS. 4-6, a stand bracket 91 is mounted to the projecting portion 89 of the lower cross pipe 74. Left and right stiffeners 92, 92 are mounted between the pair of left and right main pipes 35, 35 on the head pipe 13 side and the pair of left and right down tubes 36, 36. A front upper cross pipe 93 is mounted between the left and right stiffeners 92, 92 with a center upper cross pipe 94 being mounted between the pair of left and right main pipes 35, 35 at the center. A rear upper cross pipe 95 is mounted between the left and right pivot plates 63, 85. A distance Lc is provided between the cross pipe (lower cross pipe) 74 projecting from the pivot plate 63 on the drive shaft 33 side, which corresponds to the length of the projecting portion 89.

The pivot plate 63 is a pivot plate on the drive shaft 33 side, and is disposed on the side of the center Cm of the vehicle body with respect to the drive shaft 33. A swing arm mounting portion 101 which is a portion near the drive shaft 33 that is formed into a flat shape. More specifically, an upper end portion 102 that is mounted to the end 72 of the bent portion 62 of the left main pipe 35 is formed and superimposed on the upper end portion 102 that includes the swing arm mounting portion 101 on the side of the center axis Cm of the vehicle body with respect to the drive shaft 33. The swing arm mounting portion 101 extends from the upper end portion 102 in parallel with the center axis Cm of the vehicle body. Thereafter, the lower end portion 103, which is an end of the swing arm mounting portion 101 is mounted to the lower cross pipe 74. A pivot hole 104 which serves as a pivot is formed at a center of the swing arm mounting portion 101.

The pivot plate 85 is formed in such a manner that an upper end portion 106 that is mounted to the right main pipe 35 is formed with a swing arm mounting portion 107 that is formed continuously from the upper end portion 106. A pivot hole member 108, which serves as a pivot, is mounted to a center of the swing arm mounting portion 107. A lower end portion 111 is formed continuously from the swing arm mounting portion 107 with the lower end portion 111 being connected to the right down tube 36 (lower pipe 78) by bolts 112, 112.

In the motorcycle 11, the axial center (center axis) Cs of the rear suspension 27 is positioned outside of an axial center Cd of the drive shaft 33, and the axial center (center axis) Cs of the rear suspension 27 is positioned outside of the axial center Cd of the drive shaft 33 on the side of the universal joint 121 (see FIG. 7) by a distance Ws.

Subsequently, the swing arm 26 to be connected to these pivot plates 63, 85 will be described.

Figure 7:
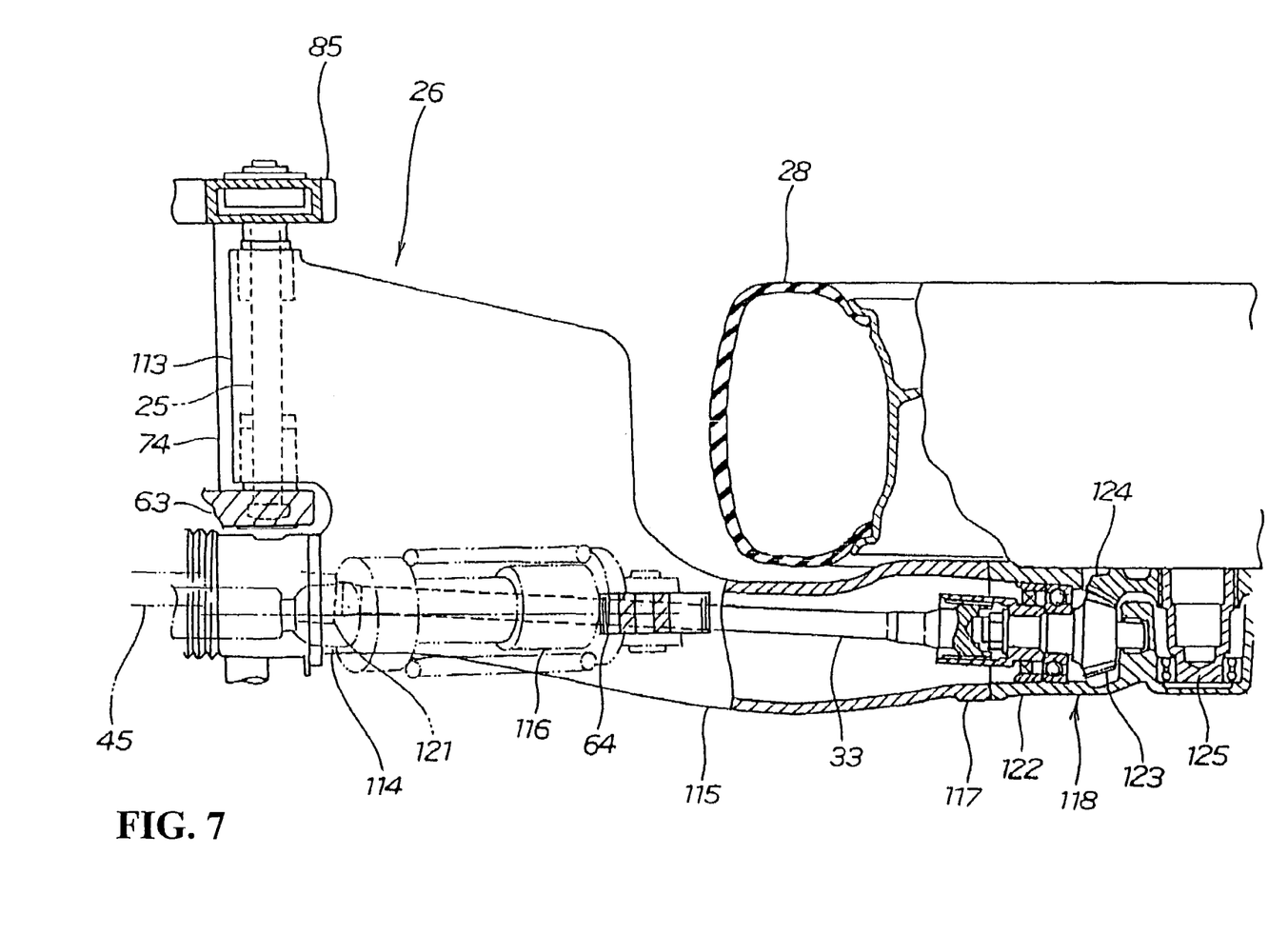
FIG. 7 is a cross-sectional view taken along a line 7-7 in FIG. 3.

FIG. 7 is a cross-sectional view taken along a line 7-7 in FIG. 3 that shows the swing arm 26.

The swing arm 26 is formed with a connecting portion 113 to be connected to the pivot plates 63, 85. The swing arm 26 is formed with a shaft connecting port 114 continuously from the connecting portion 113 and is formed with a single arm portion 115 continuously from the connecting portion 113. Thereafter, the lower connecting bracket 64 is mounted to an upper surface 116 of the arm portion 115, and the rear wheel 28 is mounted to a rear portion 117 of the arm portion 115 via a final drive 118.

The arm portion 115 also serves as a shaft case for covering the drive shaft 33.

The drive shaft 33 is connected to the output shaft 45 of the transmission unit 44 (see FIG. 2) of the V-type engine 22 (see FIG. 2) via the universal joint 121 to transmit the engine output to the final drive 118.

The final drive 118 includes the drive shaft 33, a final case 122 mounted to the rear portion 117 of the arm portion 115, a first bevel gear 123 connected to the output end of the drive shaft 33, a second bevel gear 124 engaged with the first bevel gear 123, a rear axle 125 fitted integrally with the second bevel gear 124 and cantilevering the same. Thereby, the final drive 118 drives the rear wheel 28 of the motorcycle 11.

Subsequently, a rear suspension mounting structure employed in the motorcycle 11 will be described in detail.

Figure 8:
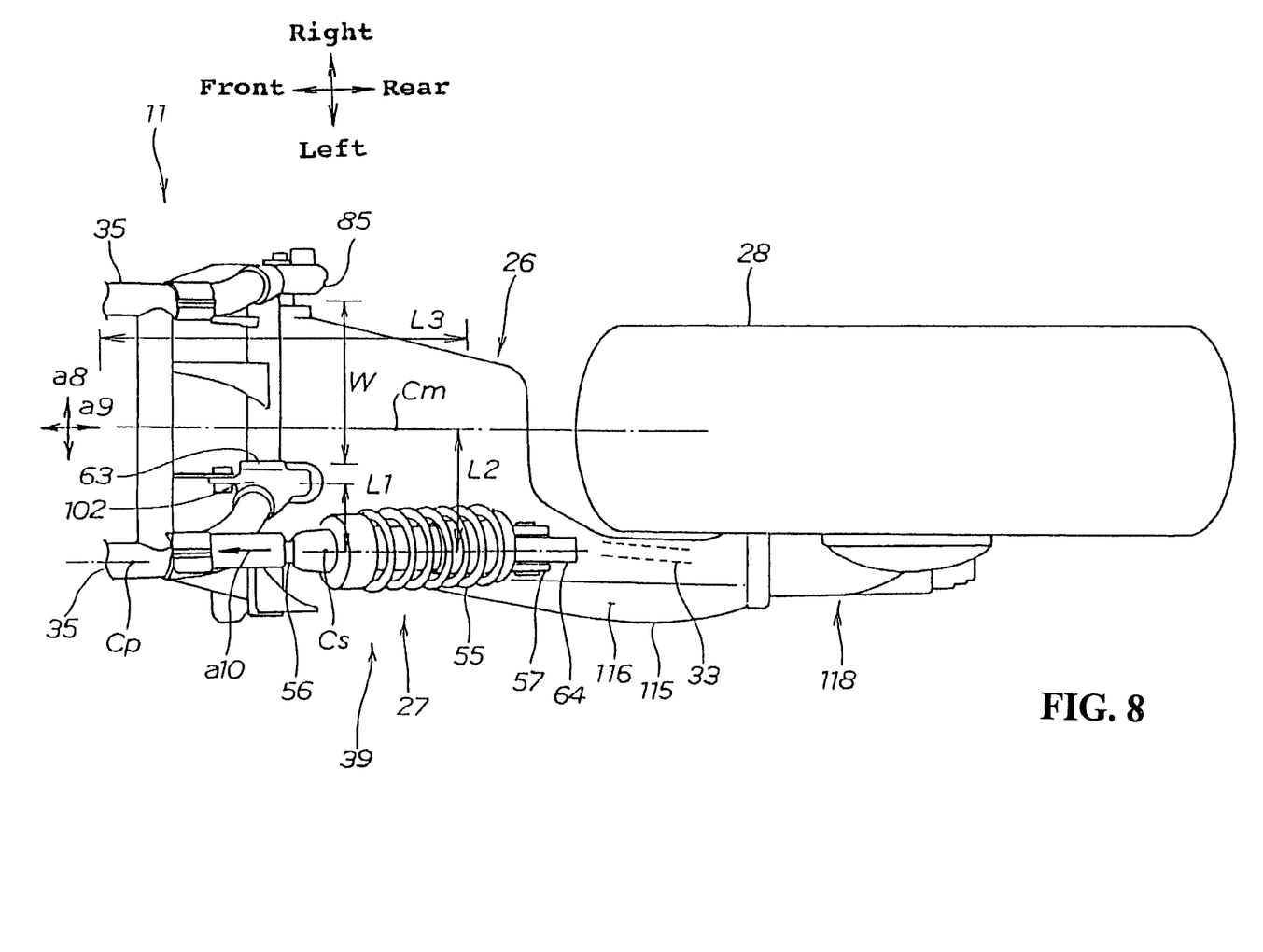
FIG. 8 is a plan view of the rear suspension which is employed in the motorcycle according to the present invention.

FIG. 8 is a plan view of a rear suspension employed in the motorcycle according to the present invention.

In the rear suspension mounting structure 39, there is a single rear suspension 27, which is disposed at a length L1 outside from the left pivot plate 63 in the direction of the width of the vehicle (a direction indicated by an arrow a8). A distance L2 is formed from the center axis Cm of the vehicle body to the rear suspension 27, and represents a value of displacement of the rear suspension 27 from the center axis Cm of the vehicle body toward the drive shaft 33.

Also, in the rear suspension mounting structure 39, the lower extremity (lower end) 57 of the rear suspension 27 is connected to the upper surface 116 of the swing arm 26 via the lower connecting bracket 64. In other words, the rear suspension 27 is disposed between the upper surface 116 of the arm portion 115 of the swing arm 26 and the left main pipe 35 continuing from the upper end portion 102 of the pivot plate 63. Furthermore, the rear suspension 27 is mounted between the left main pipe 35 and the swing arm 26 so that the center axis Cs of the rear suspension 27 aligns substantially linearly with the center axis Cp of the left main pipe 35 in the direction of the width of the vehicle (a direction indicated by the arrow a8).

Subsequently, the operation of the motorcycle according to the present invention will be described.

In the motorcycle 11, since only one rear suspension 27 is provided that is disposed outside of the pivot plate 63 in the direction of the width of the vehicle, the rear suspension does not exist inside the left and right pivot plates 63, 85. Thus, a space inside the pivot plates 63, 85 (a range of the height H in FIG. 3, the length L3 and the width W in FIG. 8) can be used for a different application. In other words, the space is secured inside the pivot plates 63, 85. Thus, flexibility in design can be enhanced.

Also, since the lower extremity (lower end) 57 of the rear suspension 27 is connected to the upper surface 116 of the swing arm 26, that is, to the upper surface 116 of the arm portion 115, a space (the range of a height H in FIG. 3, a length L3 and a width W in FIG. 8) can be secured in front of the rear wheel 28. Thus, flexibility in design can be enhanced.

As shown in FIG. 7, the swing arm 26 includes the single arm portion 115 which cantilevers the rear wheel axle 125. Thus, the swing arm has the advantage of being cantilevered.

Since the swing arm 26 in FIG. 7 is connected between the left and right pivot plates 63, 85 using a single bolt (pivot shaft) 25 so as to be capable of moving in the vertical direction, the shape (area) of the connecting portion 113 which transmits a load exerted to the swing arm 26 to the bolt 25 increases. The shape is a tubular shape. Consequently, a force (stress) exerted to the connecting portion 113 is decreased. Therefore, the strength of the swing arm 26 can be enhanced, and the strength of the fastening structure (including the left and right pivot plates 63, 85) for tightening the swing arm 26 can be enhanced.

In the motorcycle 11, since the main pipes 35, 35 are composed of two pipes on the left and right sides, and the rear suspension 27 is mounted to one of (left) main pipe 35 so as to extend continuously from the main pipe 35 in a substantially linearly direction in the direction of the length of the vehicle (an arrow a9) in the top view, a load exerted to the rear suspension 27 can be transmitted to one of (left) main pipe 35 linearly as indicated by an arrow a10 (see also FIG. 3), whereby the strength can be enhanced in a simple structure.

As shown in FIG. 6, in the motorcycle 11, the axial center (center axis) Cs of the rear suspension 27 is positioned outside the axial center Cd of the drive shaft 33. Consequently, the overhanging amount of the drive shaft 33 in the direction of the width of the vehicle (the direction indicated by the arrow a8 in FIG. 8) can be reduced.

The motorcycle of the present invention can also be applied to three-wheelers, and the application to general vehicles provides no inconvenience.

The motorcycle according to the present invention can be employed to various types of motorcycles and can be used in the motorcycle in a wide range from on-road vehicles to off-road vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   pivot plates provided at a rear portion of a main frame;
   a swing arm provided on pivots so as to be capable of moving in a vertical direction;
   a rear wheel mounted to a rear portion of the swing arm; and
   a rear suspension interposed between the swing arm and the main frame;
   wherein only one rear suspension is provided that is disposed outside the pivot plates in the direction of the width of the vehicle, and
   wherein the main frame includes a head pipe with a pair of left and right upper pipes as main frames extending from the head pipe towards the rear and a pair of left and right down tubes extending from the head pipe rearwardly and downwardly, and the rear suspension is mounted to one of the left and right upper pipes such that a center axis of the rear suspension aligns substantially linearly with a center axis of said one of the left and right upper pipes in a vertical direction.

2. The motorcycle according to claim 1, wherein a lower end of the rear suspension is connected to an upper surface of the swing arm.

3. The motorcycle according to claim 1, wherein the rear wheel is driven by a driveshaft.

4. The motorcycle according to claim 1, wherein the swing arm includes a single arm portion cantilevering an axle of the rear wheel.

5. The motorcycle according to claim 2, wherein the swing arm includes a single arm portion cantilevering an axle of the rear wheel.

6. The motorcycle according to claim 3, wherein the swing arm includes a single arm portion cantilevering an axle of the rear wheel.

7. The motorcycle according to claim 2, wherein the swing arm is connected between the left and right pivot plates by a single bolt so as to be capable of vertical movement.

8. The motorcycle according to claim 3, wherein the swing arm is connected between the left and right pivot plates by a single bolt so as to be capable of vertical movement.

9. A motorcycle comprising:
   pivot plates provided at a rear portion of a main frame;
   a swing arm provided on pivots so as to be capable of moving in a vertical direction;
   a rear wheel mounted to a rear portion of the swing arm; and
   a rear suspension interposed between the swing arm and the main frame;
   wherein only one rear suspension is provided that is disposed outside the pivot plates in the direction of the width of the vehicle,
   wherein a lower end of the rear suspension is connected to an upper surface of the swing arm, and
   wherein the rear wheel is driven by a driveshaft.

10. A motorcycle comprising:
    pivot plates provided at a rear portion of a main frame;
    a swing arm provided on pivots so as to be capable of moving in a vertical direction;
    a rear wheel mounted to a rear portion of the swing arm; and
    a rear suspension interposed between the swing arm and the main frame;
    wherein only one rear suspension is provided that is disposed outside the pivot plates in the direction of the width of the vehicle, and wherein the swing arm is connected between the left and right pivot plates by a single bolt so as to be capable of vertical movement.

11. A motorcycle comprising:
    pivot plates provided at a rear portion of a main frame;
    a swing arm provided on pivots so as to be capable of moving in a vertical direction;
    a rear wheel mounted to a rear portion of the swing arm; and
    a rear suspension interposed between the swing arm and the main frame;
    wherein only one rear suspension is provided that is disposed outside the pivot plates in the direction of the width of the vehicle,
    wherein the rear wheel is driven by a driveshaft, and
    wherein an axial center of the rear suspension is located outside of an axial center of the driveshaft.

12. A swing arm adapted to be use with a vehicle comprising:
    pivot plates adapted to be provided at a rear portion of a main frame;

pivots mounted on said swing arm for moving in a vertical direction; and a rear suspension interposed between the swing arm and the main frame;

wherein only one rear suspension is provided that is disposed outside the pivot plate in the direction of the width of the vehicle, and wherein the main frame includes a head pipe with a pair of left and right upper pipes as main frames extending from the head pipe towards the rear and a pair of left and right down tubes extending from the head pipe rearwardly and downwardly, and the rear suspension is mounted to one of the left and right upper pipes such that a center axis of the rear suspension aligns substantially linearly with a center axis of said one of the left and right upper pipes in a vertical direction.

13. The motorcycle according to claim 12, wherein a lower end of the rear suspension is connected to an upper surface of the swing arm.

14. The motorcycle according to claim 12, wherein the rear wheel is driven by a driveshaft.

15. The motorcycle according to claim 12, wherein the swing arm includes a single arm portion cantilevering an axle of the rear wheel.

16. The motorcycle according to claim 13, wherein the swing arm includes a single arm portion cantilevering an axle of the rear wheel.

17. A swing arm adapted to be use with a vehicle comprising:

pivot plates adapted to be provided at a rear portion of a main frame;

pivots mounted on said swing arm for moving in a vertical direction; and a rear suspension interposed between the swing arm and the main frame;

wherein only one rear suspension is provided that is disposed outside the pivot plates in the direction of the width of the vehicle, wherein a lower end of the rear suspension is connected to an upper surface of the swing arm, and wherein the rear wheel is driven by a driveshaft.

18. A swing arm adapted to be use with a vehicle comprising:

pivot plates adapted to be provided at a rear portion of a main frame;

pivots mounted on said swing arm for moving in a vertical direction; and a rear suspension interposed between the swing arm and the main frame;

wherein only one rear suspension is provided that is disposed outside the pivot plates in the direction of the width of the vehicle, and wherein the swing arm is connected between the left and right pivot plates by a single bolt so as to be capable of vertical movement.

* * * * *